(12) United States Patent
Scarlatella

(10) Patent No.: US 8,978,987 B2
(45) Date of Patent: Mar. 17, 2015

(54) CONTACTLESS INTEGRATED CIRCUIT DEVICE

(75) Inventor: Michele Scarlatella, Naples (IT)

(73) Assignee: STMicroelectronics International N.V., Geneva (CH)

( * ) Notice: Subject to any disclaimer, the term of this patent is extended or adjusted under 35 U.S.C. 154(b) by 5 days.

(21) Appl. No.: 11/468,816

(22) Filed: Aug. 31, 2006

(65) Prior Publication Data
US 2007/0145155 A1 Jun. 28, 2007

(30) Foreign Application Priority Data
Aug. 31, 2005 (EP) .................................... 05018926

(51) Int. Cl.
| | |
|---|---|
| G06K 19/06 | (2006.01) |
| G06K 19/077 | (2006.01) |
| H01Q 1/22 | (2006.01) |
| H01Q 1/52 | (2006.01) |
| H01Q 7/00 | (2006.01) |

(52) U.S. Cl.
CPC ............ *G06K 19/07749* (2013.01); *H01Q 1/22* (2013.01); *H01Q 1/2225* (2013.01); *H01Q 1/52* (2013.01); *H01Q 7/00* (2013.01)
USPC ........................................................ 235/492

(58) Field of Classification Search
CPC .................. G06K 19/07749; G06K 19/07771; G07F 7/1008; G06Q 20/341
USPC ............................. 235/492, 486, 488; 368/10
See application file for complete search history.

(56) References Cited

U.S. PATENT DOCUMENTS

| | | | |
|---|---|---|---|
| 5,248,989 A | 9/1993 | Murdoch | 343/841 |
| 5,768,217 A * | 6/1998 | Sonoda et al. | 368/10 |
| 6,637,665 B2 * | 10/2003 | Salzgeber | 235/492 |
| 6,853,605 B2 * | 2/2005 | Fujisawa et al. | 368/10 |
| 2003/0057288 A1 | 3/2003 | Salzgeber | 235/492 |
| 2003/0197648 A1 * | 10/2003 | Quinn et al. | 343/702 |
| 2005/0007296 A1 | 1/2005 | Endo et al. | 343/895 |

FOREIGN PATENT DOCUMENTS

WO 2004/100366 11/2004 ............... H03H 7/00

* cited by examiner

*Primary Examiner* — Rafferty Kelly
(74) *Attorney, Agent, or Firm* — Allen, Dyer, Doppelt, Milbrath & Gilchrist, P.A.

(57) ABSTRACT

An electronic device includes an integrated circuit linked to a coil antenna forming at least a spiral having opposite ends connected to the integrated circuit, and a plate support for supporting the integrated circuit and the coil antenna. The plate support is conductive and open ring shaped, wherein the internal circumference of the ring is concentric to the spiral. The opening of the ring is obtained by a cut through the plate support. The coil antenna is fastened to and isolated from the plate support through an insulating material. The cut and the plate support are filled by the same insulating material.

15 Claims, 2 Drawing Sheets

CONTACTLESS INTEGRATED CIRCUIT DEVICE

FIELD OF THE INVENTION

The invention relates to a contactless integrated circuit device comprising an integrated circuit linked to a coil antenna forming a spiral having opposite ends connected to the integrated circuit, and a plate support for supporting the integrated circuit and the coil antenna.

In particular, the invention relates to a device of the type indicated above in which the integrated circuit is powered by inductive coupling through the coil antenna by a read-write device used for receiving and transmitting a radio frequency from and towards the integrated circuit.

The invention, more particularly but not exclusively, is directed to a contactless integrated circuit device in which the integrated circuit and the coil antenna are laminated over or inside a non-conductive plate support, such as a PVC or plastic material. Devices of this kind are commonly defined as contactless integrated circuit devices.

BACKGROUND OF THE INVENTION

An integrated circuit (IC) is an electronic component designed to perform processing of digital data and memory functions. The IC is generally mounted over a frame, which is a physical support for the IC, formed in a non-conductive material, like PVC or plastic.

In particular, the IC is defined to be contactless when driven by an external read-write device, and without a direct path between the external read-write device and the IC. More particularly, this kind of IC is provided with a coil antenna forming at least a spiral, also mounted over the frame. The coil antenna is generally a wire-wound of copper, and is obtained by printing or electroplating a conductive film having opposite ends linked to the IC.

This kind of IC, known and hereinafter referred to as a contactless IC, is not powered through a connection with galvanic elements but by inductive coupling with an external read-write device. The read-write device produces an energizing RF field which couples to the coil antenna linked to the IC, thus powering the IC, and which is modulated for communication, as explained in the following description in more detail.

The contactless IC is activated by the RF operating field of the read-write device. The contactless IC waits silently for a command from the read-write device. The read-write device transmits a command to the contactless IC. The contactless IC transmits a response to the read-write device.

The contactless IC is located in the proximity of the external read-write device, and is powered by a process of electromagnetic induction from the read-write device. The information is transmitted from the contactless IC to the read-write device by use of electromagnetic waves, such as radio waves.

The RF field generated by the read-write device strictly complies with the standards specified by International Standard Organization in ISO/IEC 14443, ISO/IEC 14443A or ISO/IEC 15693. These standards specify physical characteristics of contactless ICs, their transmission protocol and rules for applications and data elements. In particular, the contactless IC must operate between a minimum unmodulated operating field Hmin and a maximum unmodulated operating field Hmax.

Even if this type of contactless IC has advantages from various points of view, it also has known drawbacks that are particularly evident when it is necessary to use it in proximity of a conductive material. As a matter of fact, the RF field generated by the read-write device and directed to the IC is disturbed by the presence of the conductive material.

For some applications it is necessary to mount the frame in close proximity to a conductive plate support, like mounting it on an aluminum substrate, such as a license plate for instance. Due to Lentz's law, the magnetic flux through the plate induces eddy currents within the metal that oppose the field responsible for their creation, thus damping the magnetic field in the surface of the metallic or conductive plate to such a degree that communication is no longer possible.

FIG. 2a is a schematic representation showing the coupling of a conventional contactless IC 1 comprising a coil antenna 3 and an IC 2 to a generic conductive plate support 4 on which the contactless IC 1 is mounted. The area of the conductive plate support 4, located underneath the coil antenna 3, creates a parasitic coil 14.

The parasitic coil 14 is tightly coupled to the coil antenna 3 to create a coupled inductance circuit that can be assimilated to a pseudo transformer, as shown in FIG. 2b. More particularly, FIG. 2b is a schematic representation of the contactless IC 1 and the parasitic coil 14 shown in FIG. 2a, rotated left-side 90 degrees around a vertical c-axis and enlarged in proximity of the IC 2. The pseudo transformer, generated by coupling the parasitic coil 14 and the coil antenna 3, is indicated with numeral reference 15.

The inductance circuit of the pseudo transformer 15 is formed by the parasitic coil 14 and is shorted for causing all the energy transferred from the read-write device 20 by magnetic flux variation to be dissipated as heat in the conductive plate support 4. As a consequence, no energy is available to power the contactless IC 1 that does not operate in this configuration.

The effect obtained by coupling the parasitic coil 14 and the coil antenna 3 is clearly described in "Fundamentals & Applications in Contactless Smart Cards and Identification, 2nd ed", RFID Handbook, ISBN: 0-470-84402-7, written by J. Wiley and states application of RFID tags directly onto a metallic surface.

To decouple magnetically the coil antenna 3 and the conductive plate support 4 it is possible to insert magnetic shielding materials, usually ferrite or Mumetal (copper and nickel alloy), between the coil antenna 3 and the conductive plate support 4. These materials have a very high permeability $\mu$ on the order of 10,000 and a very effective shielding, even with a thickness of 100$\mu$.

Nevertheless, ferrite is usually a fragile material, and the Mumetal alloy is a very expensive and very delicate material. Its use is typically not contemplated for a wide range of applications, particularly when the frame is subject to solicitations or breaks, especially when the cost of the Mumetal is very expensive compared to the cost of the entire contactless IC device. Furthermore, the presence of the magnetic shielding material changes the center frequency tuning of the antenna 13 and internal tuning capacitance. To use this approach, the contactless IC 1 must be specially manufactured, taking into account the final mounting configuration. This renders the contactless IC device unusable for a wide range of applications, not only for technical toughness but also because the standards ISO/IEC 14443, ISO/TEC 14443A or ISO/IEC 15693 cannot be duly respected.

SUMMARY OF THE INVENTION

In view of the foregoing background, an object of the present invention is to provide a contactless IC device that transmits RF signals between the read-write device and the IC even when in the presence of a conductive material. This is while meeting the standards specified by International Standard Organization in ISO/IEC 14443, ISO/IEC 14443A or ISO/IEC 15693 and capable of overcoming, simply and economically, all the above-mentioned drawbacks associated with the known art.

This and other objects are provided by an electronic device comprising an integrated circuit linked to a coil antenna forming at least a spiral having opposite ends connected to the integrated circuit, and a plate support for supporting the integrated circuit and the spiral antenna. The plate support may be a conductive plate, open ring shaped wherein the internal circumference of the ring may be concentric to the spiral. The opening of the ring may be obtained by a cut through the plate support.

BRIEF DESCRIPTION OF THE DRAWINGS

The features and advantages of the invention will be apparent from the following description of an embodiment thereof, given by way of a non-limiting example with reference to the accompanying drawings.

DETAILED DESCRIPTION OF THE PREFERRED EMBODIMENTS

Figure 1:
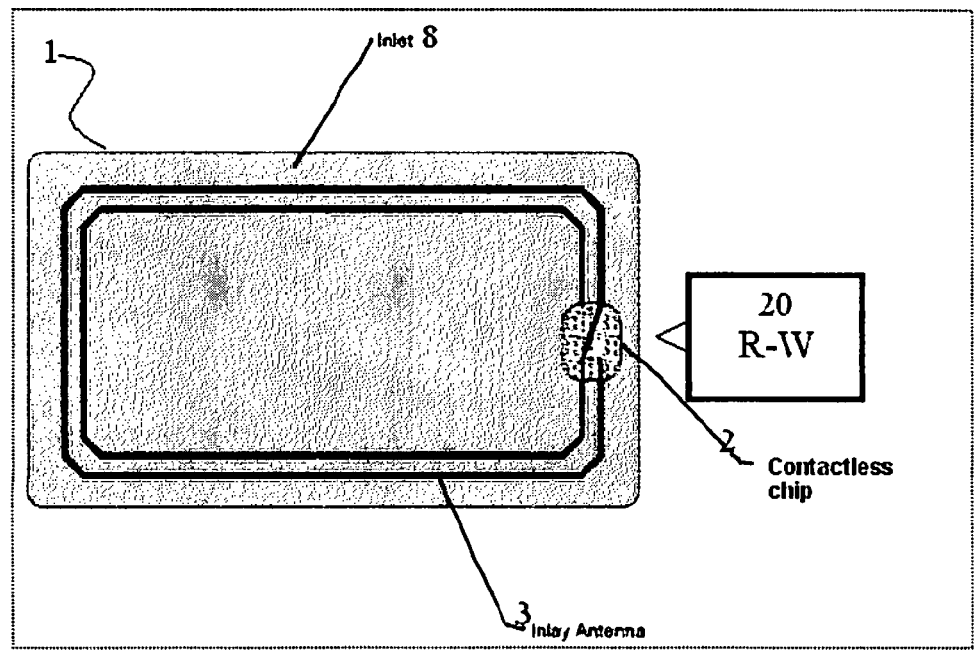
FIG. 1 is a representation of a contactless IC laminated inside a frame composed of a non-conductive material in accordance with the prior art.
Figure 2A:
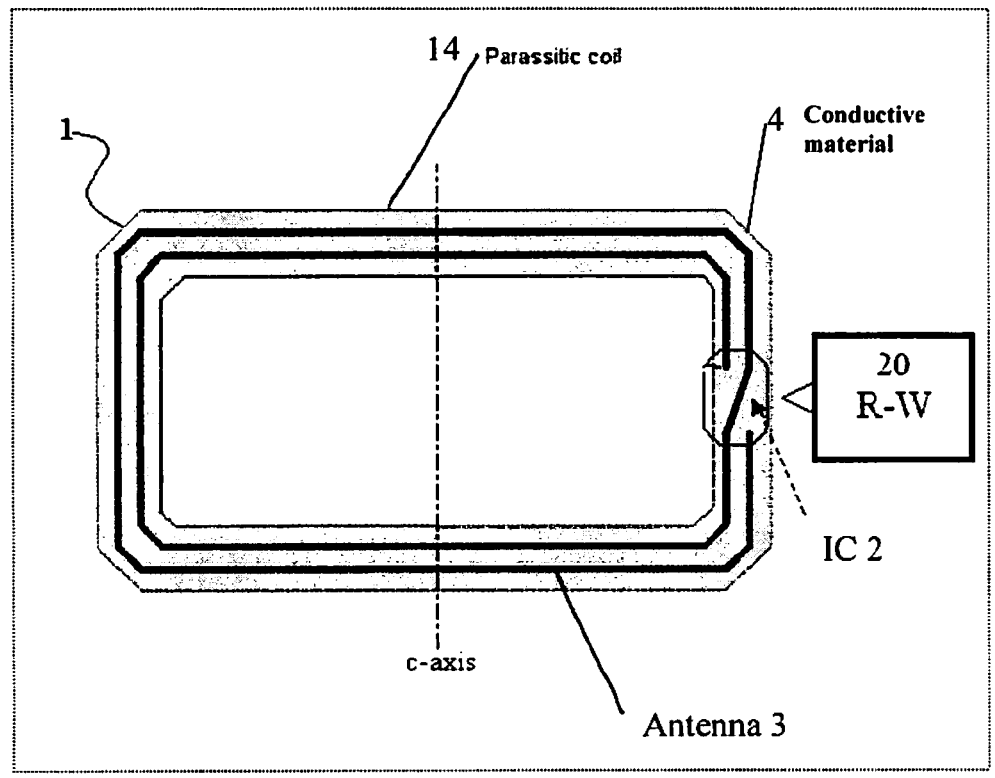
FIG. 2a is a schematic representation of a contactless IC located on a parasitic coil in accordance with the prior art.
Figure 2B:
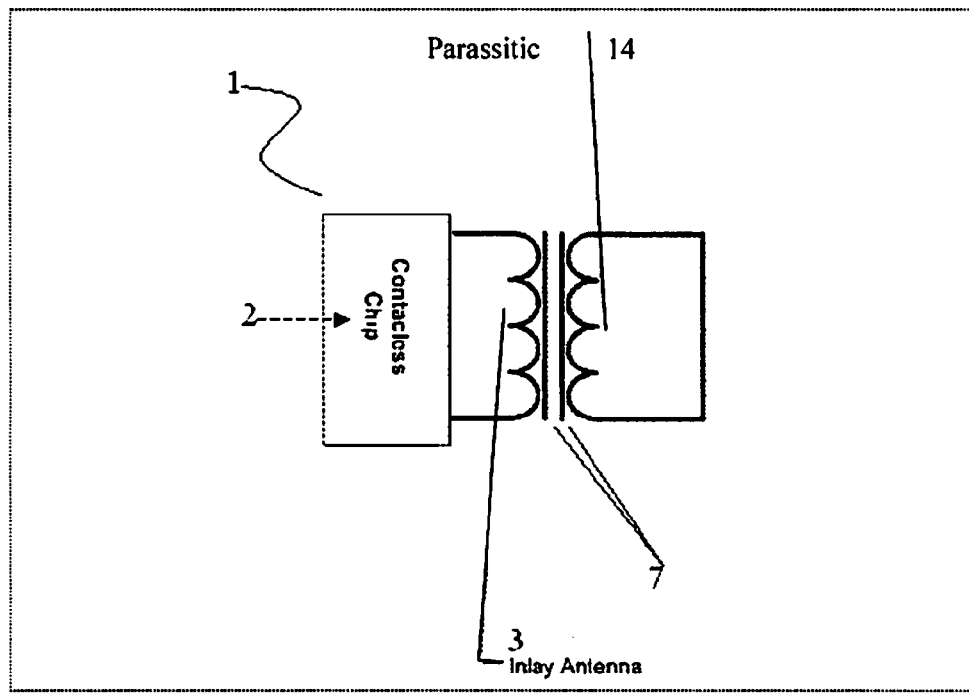
FIG. 2b is a schematic representation of the contactless IC and the parasitic coil of FIG. 2a, rotated left-side around the vertical c-axis and enlarged in proximity of the IC.
Figure 3:
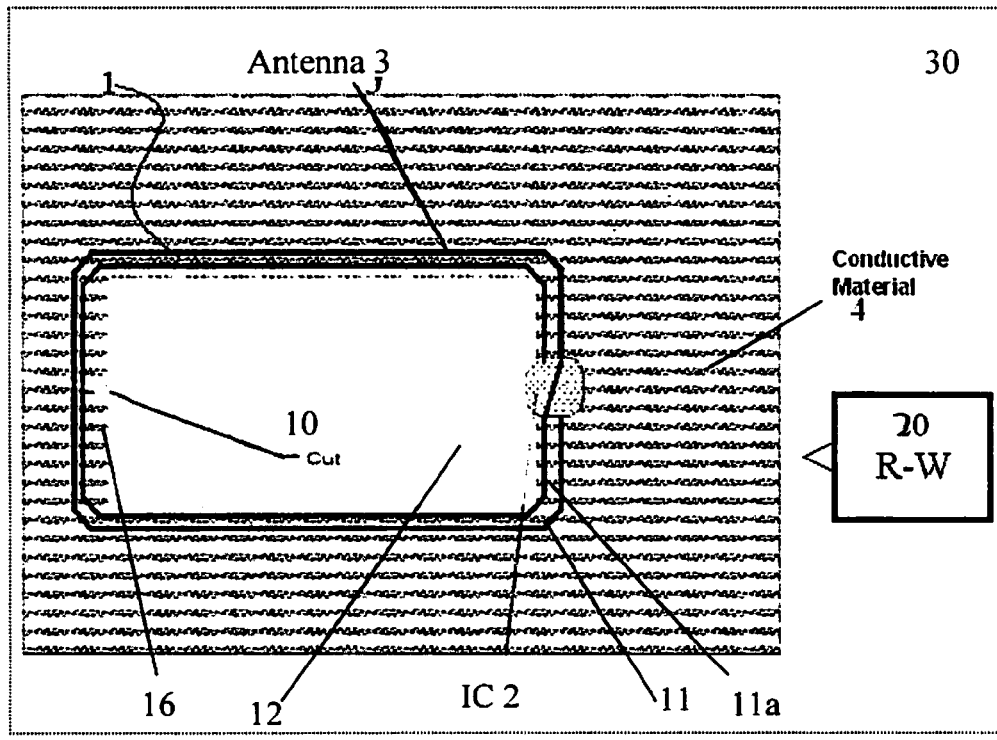
FIG. 3 is a schematic representation of the contactless IC device in accordance with the present invention.

Referring now to FIG. 3, a contactless integrated circuit device 30 formed in accordance with the present invention is shown. The device 30 comprises a contactless integrated circuit 1 including an integrated circuit 2 and a coil antenna 3, preferably wire-wound and forming at least a spiral 11,11a having opposite ends linked to the IC 2. The integrated circuit 2 and the coil antenna 3 are supported by a plate support 4.

A read-write device 20 may be used, in proximity of the device 30, to power it by inductive coupling through the coil antenna 3 and to establish a contactless communication in radio frequency between the read-write device 20 and the integrated circuit 2. As a preference, this contactless communication is performed according to the standard specified by the International Standard Organization in ISO/IEC 14443, ISO/IEC 14443A or ISO/IEC 15693.

The plate support 4 is a conductive plate with a central aperture 12 and an open ring shaped wherein the internal circumference 16 of the ring is concentric to the spiral 11 and the opening of the ring is obtained by a cut 10 through the plate support 4. The cut 10 is made by machine milling or punching, from the internal circumference 16 to the external border of the plate support 4. This creates a discontinuity element on the same border plate.

Advantageously, the cut 10 and the internal circumference 16 prevent induction of the parasitic inductive circuit described above and represented by the pseudo transformer 15 and generated by coupling the conductive plate support 4 with the coil antenna 3, and avoiding the shunt of the induced magnetic energy.

The conductive plate support 4 in fact, with the open ring shape described above, couples with the antenna 3 without constituting a parasitic coil, due to the discontinuity element that breaks the pseudo transformer 15. This allows the read-write device 20 to transfer all the energy to the coil antenna 3, and consequently, from the coil antenna to the IC, without dissipation on the conductive plate support 4 and without altering the tuning frequency of the contactless IC.

In particular, the cut 10 and the internal circumference 16 are made without compromising the hardness of the conductive plate support 4. The width of the cut 10 is not significant with respect to the border size of the surface, and the internal circumference 16 is dimensioned within it. This allows for applications in which the conductive plate support 4 needs to form a tough base and protect the contactless IC.

The device 30 can be used to include a contactless IC, containing matriculation data about a vehicle, arranged on a license plate formed by a metallic plate support of the type described above. The internal circumference, not relevant with respect to the license plate surface, is filled with an insulating material, like resin, fastening the contactless IC to the license plate.

In this respect the conductive plate support 4 can also have a reduced thickness because the insulating material insertion inside the cut 10 and the internal circumference 16 guarantees the plate support 4 to remain a planar and rigid body, despite the discontinuity caused by the cut 10.

The manufacturing of this kind of conductive plate support 4 is very straightforward and economic, especially through machine milling and punching, for easily carving out the cut 10 and the internal circumference 16 so as to make possible the use of a contactless IC associated with conductive material on a very large scale.

From the foregoing it will be appreciated that although specific embodiments of the invention have been described herein for purposes of illustration, various modifications may be made without deviating from the spirit and scope of the invention. Accordingly, the invention is not limited except as by the appended claims.

Advantageously, and according to another embodiment of the present invention, the device 30 described can be used for coupling a conductive plate support 4 with a contactless IC 1 already laminated inside a traditional frame 8, in a PVC or plastic material.

This allows one to maintain compatibility with the contactless IC 1 already produced and embedded inside a traditional frame 8, as well to produce a contactless IC 1, laminating it on an insulating material, independently from their potential and future use near a conductive plate support.

The contactless IC device 30 according to the present invention advantageously deletes the parasitic effect obtained by coupling a coil antenna 3 with a conductive plate support 4 simply and economically, providing a device 30 that can be used for a wide range of applications in which the contactless IC 1 is used in proximity of a conductive material 4, or when the same support of a contactless IC 1 is a conductive material 4.

That which is claimed:

1. An electronic device comprising:
   an integrated circuit;
   a coil antenna forming at least one spiral and having opposite ends coupled to said integrated circuit;
   a rigid plate support for supporting said integrated circuit and said coil antenna, and having a central aperture therethrough with said coil antenna around an external perimeter of the central aperture;

said rigid plate support comprising a conductive material and having a lateral cut extending towards the central aperture resulting in said rigid plate support forming an open ring or C-shape;

an insulating layer between said rigid plate support and said coil antenna, with said insulating layer being non-conductive and directly contacting said coil antenna; and an insulating material filling the lateral cut to maintain continuity between said rigid plate support and the lateral cut therein, as well as to maintain said rigid support plate in a planar and rigid position;

said rigid support plate and said insulating material filling the lateral cut therein supporting an entire length of said coil antenna.

2. An electronic device according to claim 1 further comprising a non-conductive frame, and wherein said integrated circuit and said coil antenna are inside said non-conductive frame.

3. An electronic device according to claim 2 further comprising an insulating material, and wherein said rigid plate support is coupled through said insulating material to said non-conductive frame.

4. An electronic device according to claim 1 wherein the central aperture in said rigid plate support has a rectangular-shape.

5. An electronic device according to claim 1 wherein said rigid plate support and the central aperture substantially forms an open frame structure.

6. An electronic device comprising:
an integrated circuit;
a coil antenna forming at least one spiral coupled to said integrated circuit;
a rigid conductive plate support for supporting said integrated circuit and said coil antenna, and having an aperture therethrough with said coil antenna around an external perimeter of the aperture;
said rigid conductive plate support comprising a conductive material and including an opening extending from an outer edge thereof to the aperture;
an insulating layer between said rigid conductive plate support and said coil antenna, with said insulating layer being non-conductive; and
an insulating material filling the opening to maintain continuity between said rigid conductive plate support and the opening therein, as well as to maintain said rigid support plate in a planar and rigid position;
said rigid support plate and said insulating material filling the lateral cut therein supporting an entire length of said coil antenna.

7. An electronic device according to claim 6 further comprising a non-conductive frame, and wherein said integrated circuit, said insulating layer and said coil antenna are inside said non-conductive frame.

8. An electronic device according to claim 7 further comprising an insulating material, and wherein said rigid conductive plate support is coupled through said insulating material to said non-conductive frame.

9. An electronic device according to claim 6 wherein the aperture in said rigid conductive plate support has a rectangular-shape.

10. An electronic device according to claim 6 wherein said rigid conductive plate support and the aperture substantially forms an open frame structure.

11. A method for making an electronic device comprising:
providing a coil antenna forming at least one spiral and coupled to an integrated circuit;
supporting the integrated circuit and the coil antenna on a rigid plate support comprising a conductive material, and with the rigid plate support having a central aperture therethrough with the coil antenna around an external perimeter of the central aperture;
providing an insulating layer between the rigid plate support and the coil antenna, with the insulating layer being non-conductive and directly contacting the coil antenna;
forming a lateral cut in the rigid plate support extending towards the central aperture resulting in the rigid plate support forming an open ring or C-shape; and
filling the lateral cut with an insulating material to maintain continuity between the rigid plate support and the lateral cut therein, as well as to maintain the rigid support plate in a planar and rigid position;
the rigid support plate and the insulating material filling the lateral cut therein supporting an entire length of the coil antenna.

12. A method according to claim 11 further comprising laminating the integrated circuit and the coil antenna inside a non-conductive frame.

13. A method according to claim 12 further comprising coupling the rigid plate support through insulating material to the non-conductive frame.

14. A method according to claim 11 wherein the aperture in the rigid plate support has a rectangular-shape.

15. A method according to claim 11 wherein the rigid plate support and the aperture substantially forms an open frame structure.

* * * * *